Nov. 30, 1965   H. D. HADLER   3,220,171
FEEDING MECHANISM FOR HAY BALER
Filed June 24, 1964
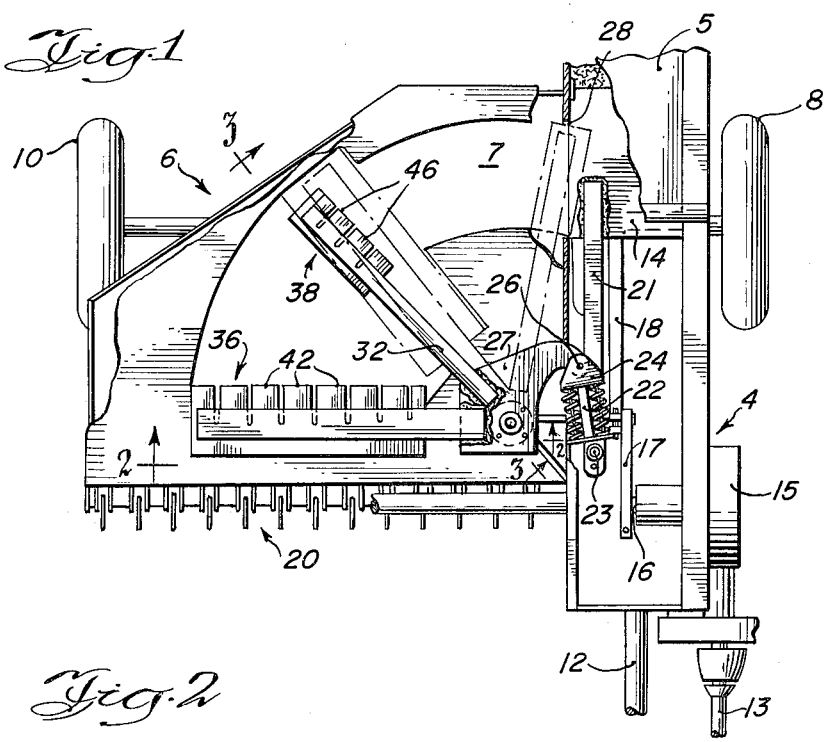
Fig. 1
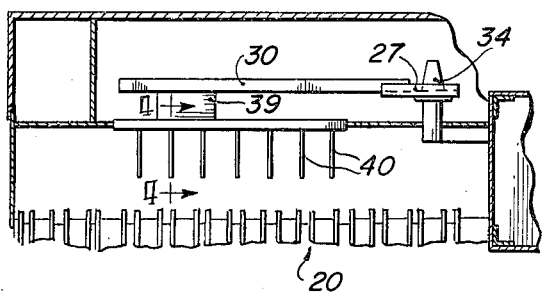
Fig. 2
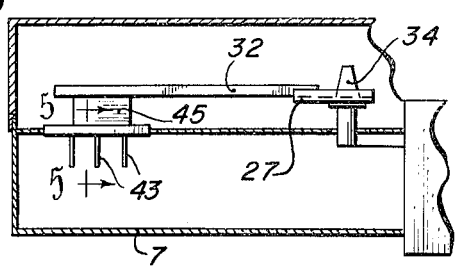
Fig. 3
Fig. 4
Fig. 5
INVENTOR
Howard D. Hadler
BY Jack Shore
ATTORNEYS.

United States Patent Office 3,220,171
Patented Nov. 30, 1965

3,220,171
FEEDING MECHANISM FOR HAY BALER
Howard D. Hadler, Davenport, Iowa, assignor to J. I. Case Company, Racine, Wis., a corporation of Wisconsin
Filed June 24, 1964, Ser. No. 377,736
2 Claims. (Cl. 56—341)

This invention relates to a feeding mechanism for a baler and, particularly, to one employing a sweep feed mechanism that moves the material to be baled in an arcuate path between the pickup and bale chamber.

Within recent years, there have appeared on the market balers in which the feeder head moves in an arcuate path when transferring the hay, straw or other material being baled from the pickup into the bale chamber. The feeder head is connected to a sweep arm that is usually driven off the baler plunger and is positioned to move in synchronism therewith. The feeder head contains a plurality of downwardly extending, pivotally mounted fingers that function to direct the hay into the bale chamber when moved in one direction and to pass over the hay located on the feeder housing when moved in the other direction. The bale plunger may be operated by a separate motor or by a power take-off from the tractor used to pull the baler.

In a baler of this type, the sweep arm is pivotally mounted relative to the baler frame and is operated so that the feeder head is extended into the baler chamber when the plunger is in the retracted or forward position. Conversely, when the plunger is moved rearwardly to compress the material in the bale chamber, the sweep arm is pivoted to move the feeder head out of the bale chamber, and at the end of its travel is located generally normal to the direction of movement of the baler and adjacent to the pickup moving hay onto the platform beneath the feeder head. The synchronized movement of the plunger and sweep arm is then repeated to direct another charge of hay into the bale chamber. The sweep arm and feeder head move through an angle in excess of 90° and the speed at which the sweep arm is operated is limited by the acceleration forces it is designed to withstand. This type of operation has proven very successful, and balers of this type are disclosed in Evans et al. Patent No. 3,103,775 and Roy Patent No. 3,106,814, which patents are assigned to the assignee of the present invention.

While balers of this type disclosed in the aforementioned patents function in a generally satisfactory manner, they are limited in their effectiveness due to the size and speed limitations placed on them due to their travel path and the functions they must perform. The size limitation is due to the fact that the feeder head must have a relatively small width since it must be capable of passing through a side opening in the bale chamber to force hay into said chamber. With this size limitation, the head is only capable of picking up a fraction of the material deposited on the feeder housing platform by the pickup. The need for the head to perform this dual function resulted in a head mechanism which is not ideally suited for either of the two functions.

The present feeder head-sweep arm design is deficient in another respect in that it is necessary that the feeder head travel through an angle in excess of 90° between the pickup and the bale chamber. The acceleration forces resulting from the movement of the head through this angle severely limits the speed at which the sweep head can be operated.

In accordance with the present invention, there is provided a novel feeder head-sweep arm assembly wherein the majority of the hay deposited on the baler platform is picked up and subsequently directed into the bale chamber and the baler is capable of operating at higher speeds than was heretofore possible.

The novel sweep arm-feeder head assembly consists of a first sweep arm that has a feeder head attached to its other end, which head is designed to function exclusively as a feeder. The head extends across a major portion of the hay receiving platform and grips and moves the material disposed on the feeder housing platform by the pickup into an area adjacent the side opening in the bale chamber. The arcuate travel of the sweep arm is substantially less than 90° and the feeder head is not intended to fit into the side opening of the bale chamber. The feeder head includes a plurality of downwardly extending pivotally mounted fingers which are positioned to engage the material during the rearward or packing movement of the feeder head and to move up and out of the way of the material during the forward or return movement of the head.

The novel sweep arm-feeder head assembly also includes a second or packing head that is fixed relative to the feeder head but is angularly spaced therefrom. The width of the packing head is much smaller than the first head and is designed so that it can fit into the side opening of the bale chamber. The packing head contains a number of crop gripping fingers that function to engage the material deposited by the first feeder head and pack it into the bale chamber when the bale plunger has been moved clear of the bale chamber side opening. The angle through which the novel sweep arm-feeder assembly is moved is greater than the angle between the two head assemblies, thereby resulting in an overlapping action of the feeder and packer heads. That is to say, the feeder head will move the material across the platform of the baler housing into a position rearwardly of the packer head when the packer head is in its foremost position. Thus, the packer head will, when returned to its forward position, be in position to engage the previously deposited material and move it into the bale chamber. The aforementioned novel assembly is thus moved through a much smaller angle than when only a single head is used. This permits the assembly to be operated at a higher rate than a single head moved through a larger angle without exceeding the acceleration forces built up by the previous single head design.

Numerous other features and advantages of the present invention will become readily apparent from the following detailed description and from the attached drawings, in which:

FIGURE 1 is a plan view, partially broken away, of a baler incorporating the invention;

FIGURE 2 is a cross-sectional view taken along line 2—2 of FIGURE 1;

FIGURE 3 is a cross-sectional view taken along line 3—3 of FIGURE 1;

FIGURE 4 is a sectional view taken along line 4—4 of FIGURE 2; and

FIGURE 5 is a sectional view taken along line 5—5 of FIGURE 3.

Referring first to FIGURE 1, there are shown in some detail the various components of the sweep feed baler incorporating the novel sweep arm-feeder head assembly hereinafter referred to as the "sweep feed 1" when talking about the complete assembly. A baler of this general type is described in detail in the previously referred to Evans and Roy patents, and only those components which are necessary to an understanding of the present invention will be discussed herein.

The baler shown in the drawings generally includes a bale case 4 defining a baling chamber 5 into which the material to be baled is directed by the sweep feed 1. Located adjacent the bale chamber and affixed thereto is a feeder housing 6 including a platform 7 and suitable top and side walls within which the sweep feed assembly oscillates. The bale case and housing are supported at their rear by ground engaging wheels 8, 10 and at their front to a tractor by a draw-bar 12.

The baler disclosed in the drawing is a "pull-type," power take-off baler that is pulled by a tractor (not shown) through the draw-bar 12 and is driven from the tractor by a power take-off shaft 13. The power from the tractor motor is transmitted to the baler plunger 14 and the associated sweep feed assembly through gear housing 15, crank shaft 16, crank 17 and pitman 18.

The sweep feed assembly is located in the feeder housing and functions to oscillate between a position adjacent a pickup 20 and the baling chamber 5. The synchronized movement of the plunger 14 and the sweep feed assembly 1 is brought about through a rod 21 secured to the plunger and a link 22 pivoted at one end to rod 21 by pin 23 and connected through a yoke 24 and pin 26 to a pivotally mounted arm 27 that is part of the sweep feed assembly 1. The latter arrangement is designed so that the sweep head will be in the forward position shown in solid lines when the plunger 14 is moved to the position shown in FIGURE 1. Conversely, when the plunger is moved forwardly out of closing engagement with baler side opening 28, the sweep head will be moved into the position shown in broken lines in FIGURE 1.

The novel sweep feed assembly to which this application is primarily directed includes a pair of angularly spaced sweep arms 30, 32 that are fixedly connected at their inner ends to the pivotally mounted arm 27. The arm 27 is pivotally mounted relative to the baler frame by a bracket pivot structure 34. Secured to the outer ends of the arms 30, 32 are feeder heads 36, 38, respectively. Each head contains a plurality of downwardly disposed, pivotally mounted fingers adapted to engage the crop material located on the platform 7 of the feeder housing 6 by the pickup 20. The forwardmost or "pusher" head 36 is connected to sweep arm 30 through a bracket 39. As shown in FIGURE 4, the pusher head 36 has a streamlined undersurface that makes for smoother forward movement of the feeder head. The feeder head 36 has suitably secured thereto a plurality of transversely spaced, pivotally mounted crop engaging fingers 40. The movement of these fingers in a clockwise direction (FIGURE 3) is arrested by a support member 41. The fingers will be moved into this position by the hay and in such position will act to move the hay across the housing platform during rearward movement thereof. The fingers 40 are free to move in the counterclockwise direction. The feeder head 36 also includes transversely spaced slots 42 into which the fingers 40 move during the forward movement of the feeder head. Thus, when the feeder head moves rearwardly, the fingers will be in the position shown in FIGURE 4 wherein they grip the hay and move it rearwardly across the platform 7, and when the feeder head moves in the opposite direction to grab another charge of hay deposited on platform 7 by pickup 20, the fingers 40 move up into the slots 42.

The packing head 38 is similar to the feeder head 36 in that it includes a plurality of transversely spaced crop engaging fingers 43 that are free to move in the counterclockwise direction (FIGURE 5), but are limited in their clockwise movement by support member 44. The packing head 38 is connected to a bracket 45 that is secured to and depends from the feed arm 32. The head 38 also defines slots 46 into which the fingers move during forward movement of the sweep feed assembly. The undersurface of feeder head 38 is similarly streamlined to reduce the resistance thereof when the head is moved forward to grab another charge of hay. The packer head 38 is angularly spaced from the feeder head 36 by an angle on the order of 45° in the direction toward the bale chamber side opening 28. The packer head 38, while similar in overall construction to the feeder head 36, differs therefrom in that it is narrower, since it must be capable of fitting into the bale chamber side opening 28.

It can be appreciated that with this design the total arcuate travel of the sweep feed assembly need only be on the order of 60° to obtain the desired results.

The operation of the baler is as follows:

The baler is pulled by a tractor through the draw-bar 12, over a field containing a crop which has previously been cut and windrowed. The crop is picked up from the ground and placed on the housing platform 7 by the pickup 20. Once on the platform, the novel sweep arm-feeder head assembly 1 takes over to move the crop into the bale chamber 5. Specifically, with the feeder platform empty and the plunger 14 retracted, the sweep head assembly 1 including the heads 36 and 38 is moved in a clockwise direction to the position shown in broken lines in FIGURE 1. This action results in the material deposited on a feeder platform being moved by the head 36 into a position on the platform rearward of the forwardmost position of the packer head 38. The sweep head is then moved to its forwardmost position during which period the crop engaging fingers 40, 43 move upward into the slots 42, 46 formed in their respective heads. With the next movement of the sweep head assembly, the feeder head 36 grabs another charge of hay and moves it into the same position. Also, at the same time, the charge of material previously deposited rearwardly of the packer head 38 by feeder head 36 is moved by the packer head 38 into the bale chamber 5 through the side opening 28. The repeated oscillation of the sweep feed assembly as determined by the plunger will continue to direct material into the bale chamber to form succeeding bales.

It will be appreciated that the extended width of the feeder head 36 results in the feeder head engaging a major portion of the material deposited on the platform by the pickup to move it across the platform to a space adjacent the bale side opening whereat the packer head can efficiently function to move and compress the material into the bale chamber.

It is obvious that many substitutions of equivalents can be made. For example, the two feeder heads can be mounted on separate arms, as long as they are operated in conjunction with the movement of the plunger.

It is, of course, intended to cover by the appended claims all such modifications as fall within the true spirit and scope of the invention.

I claim:

1. A baler including a bale chamber having a side opening, a plunger slidable in said chamber, a platform secured to the baler adjacent said bale chamber, pickup means located at right angles to the bale chamber and disposed to direct material onto said platform, a sweep feed assembly swingable in an arcuate path, said sweep feed assembly being disposed above said platform and moved from said pickup means to said bale chamber opening through an angle of approximately 45°, a drive mechanism interconnecting said plunger and sweep arm assembly to effect oscillation of the sweep assembly upon reciprocation of the plunger to direct material into the chamber as the plunger is moved away from the baler side opening, said sweep feed assembly including radially extending sweep arms spaced apart at an angle of approximately 45°, a head assembly secured to the outer end of each of said sweep arms including a plurality of transversely spaced, downwardly disposed, hingedly mounted fingers, the width of the head assembly closest the baler side opening being narrower than said opening whereby it can enter said opening during arcuate movement of the sweep arm assembly, the other head assembly extending across a major portion of the platform whereby most of the material deposited thereon will be moved across said platform into position to be engaged by said other head assembly.

2. A baler including a bale chamber having a side opening, a plunger slidable in said chamber, a platform secured to the baler adjacent said bale chamber, pickup means located at right angles to the bale chamber and disposed to direct material onto a receiving section of said platform, a sweep feed assembly disposed above said platform and swingable in an arcuate path of approximately 45° between said pickup and said bale chamber opening, a drive mechanism interconnecting said plunger and sweep arm assembly to effect oscillation of the sweep assembly upon reciprocation of the plunger to direct material into the chamber as the plunger is moved away from the baler side opening, said sweep feed assembly including radially extending sweep arms spaced at an angle of less than the arcuate travel of said sweep feed assembly whereby the sweep arms will overlap each other during the operation of the sweep arm assembly, a head assembly secured to the outer end of each of said sweep arms and having secured thereto a plurality of transversely spaced, hingedly mounted fingers, the head assembly closest to the baler side opening being narrower than said opening whereby it can enter said opening during arcuate movement of the sweep feed assembly, and the width of the other head assembly being slightly less than that of the receiving section of the platform whereby the material deposited thereon will be moved across said platform into position to be engaged by said other head assembly.

References Cited by the Examiner

UNITED STATES PATENTS

| | | | |
|---|---|---|---|
| 101,246 | 3/1870 | Farrington | 56—164 |
| 194,670 | 8/1877 | Goetze | 56—164 |
| 2,545,188 | 3/1951 | Baskerville | 100—42 |
| 3,106,814 | 10/1963 | Roy | 56—341 |

FOREIGN PATENTS 1,291,028  3/1962  France.

ABRAHAM G. STONE, *Primary Examiner.*

RUSSELL R. KINSEY, *Examiner.*

M. C. PAYDEN, *Assistant Examiner.*